May 12, 1936.   E. N. JACOBI   2,040,258
MOUNTING MEANS FOR AUTOMOBILE DOORLOCKS
Filed Aug. 27, 1934   2 Sheets-Sheet 1
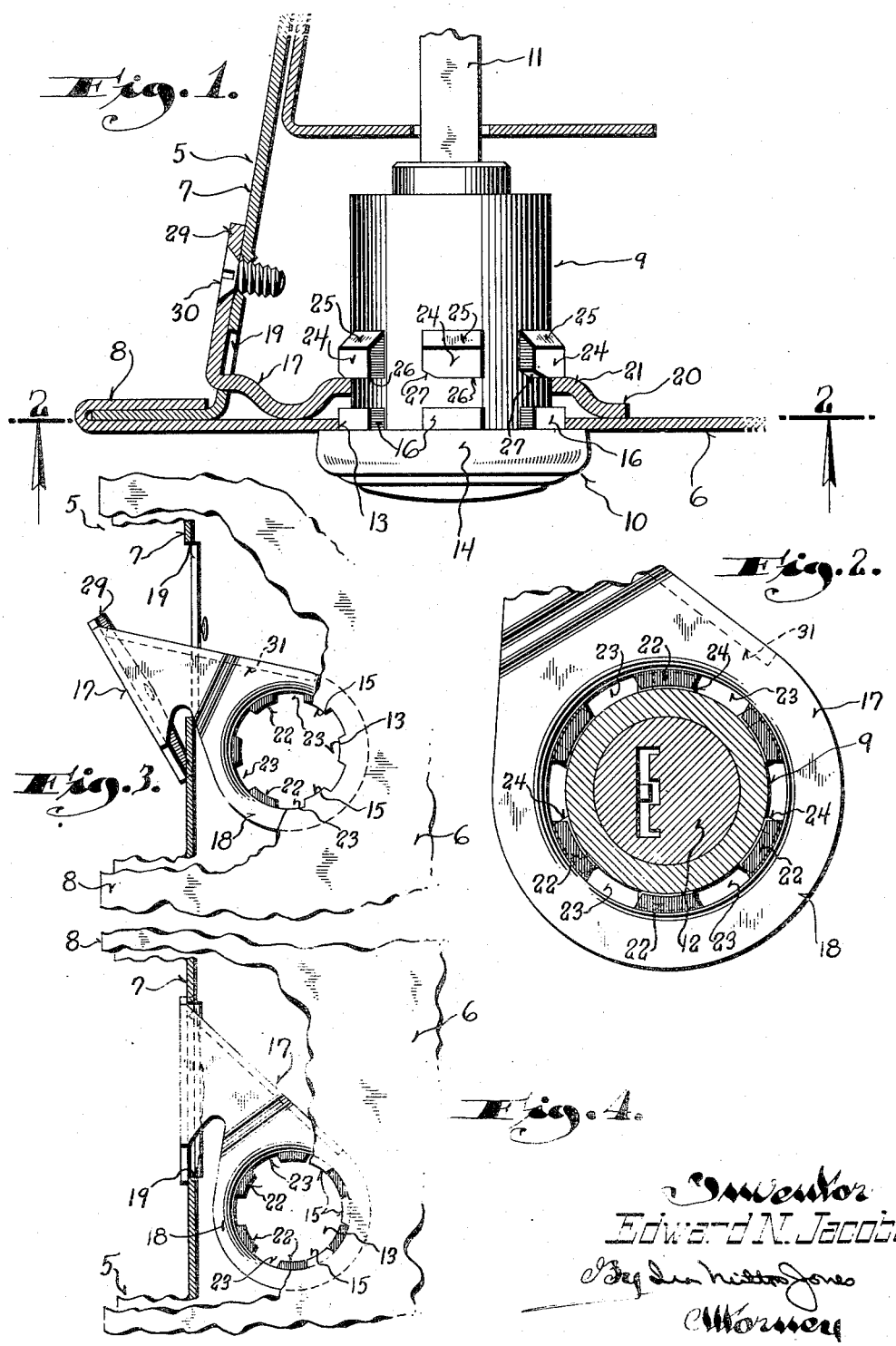

May 12, 1936. E. N. JACOBI 2,040,258
MOUNTING MEANS FOR AUTOMOBILE DOORLOCKS
Filed Aug. 27, 1934 2 Sheets-Sheet 2
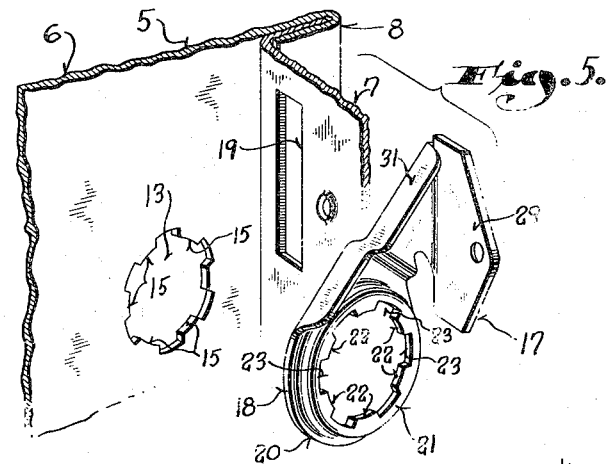
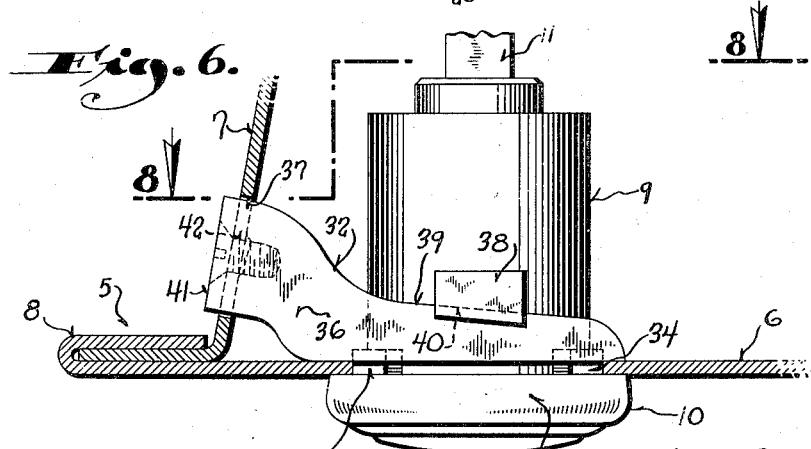
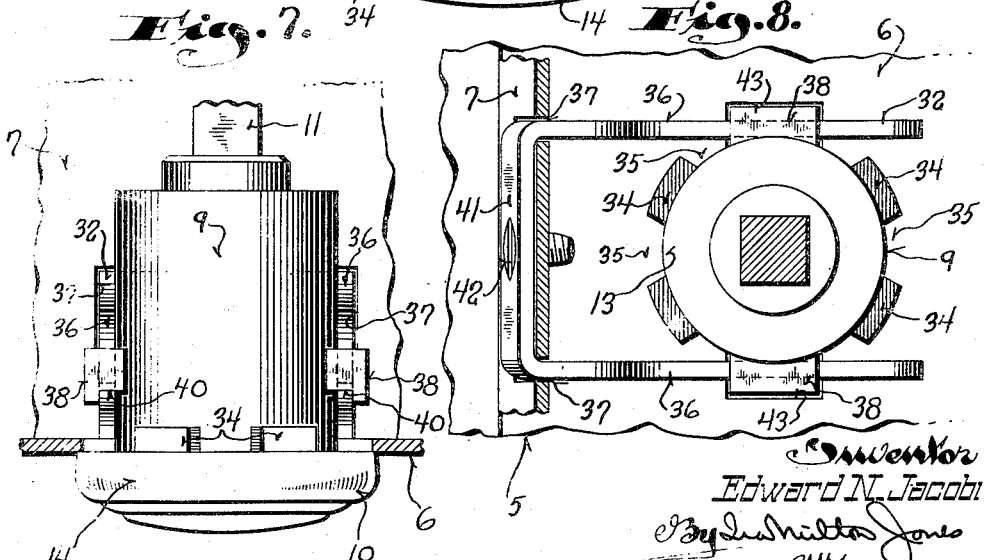
Inventor
Edward N. Jacobi Patented May 12, 1936

2,040,258

UNITED STATES PATENT OFFICE 2,040,258

MOUNTING MEANS FOR AUTOMOBILE DOORLOCKS

Edward N. Jacobi, Milwaukee, Wis., assignor to Briggs & Stratton Corporation, Milwaukee, Wis., a corporation of Delaware Application August 27, 1934, Serial No. 741,538

19 Claims. (Cl. 70—46)

This invention relates to improvements in mounting means for automobile door locks.

It is an object of this invention to provide a simple device for fastening a conventional cylinder lock in the wall of an automobile door.

More specifically, it is an object of this invention to provide a fastening means for securing cylinder locks in automobile doors, which is strong against forced rotation and against outward pull to securely hold the lock in place.

Another object of this invention is to provide a fastening of the character described which is so constructed that the cylinder is held in its proper place under spring tension to preclude loosening of the parts and the consequent rattles.

Another object of this invention is to provide a fastening of the character described which is entirely concealed within the door and which is secured in place by a single fastening screw.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 1 is a section view through an automobile door, illustrating the lock cylinder held in place by one form of the fastening means of this invention;

Figure 2 is a section view through Figure 1 on the plane of the line 2—2;

Figure 3 is a fragmentary view illustrating a portion of the door and the fastening means in position to receive the cylinder;

Figure 4 is a view similar to Figure 3 showing the fastening means turned to its operative securing position;

Figure 5 is a perspective view showing the inside of the door and the fastening means;

Figure 6 is a view similar to Figure 1 illustrating a slightly modified form of this invention;

Figure 7 is a longitudinal section view through an automobile door illustrating a lock in side elevation and showing the modified form of fastening means from its inner end;

Figure 8 is a section view taken through Figure 6 on the plane of the line 8—8.

Referring now more particularly to the accompanying drawings in which like numerals indicate like parts throughout the several views, the numeral 5 designates the door of an automobile which, as is customary, has an outer side wall 6 and an end wall 7 connected by a flange 8 which projects beyond the end wall as illustrated.

Mounted within the door, there is a latch mechanism (not shown) through which the door is secured in closed position. This latch mechanism is arranged to be locked against actuation by means of a cylinder lock indicated generally by the numeral 9 mounted on the side wall 6 with its outer end 10 accessible for the insertion of a key. A driving stem or shaft 11, projects from the inner end of the lock to transmit rotation of its cylinder 12 upon rotation thereof by a proper key, to the latch mechanism (not shown).

The driving stem 11 is arranged to operatively engage the latch mechanism upon axial insertion of the lock into an opening 13 in the side wall 6 of the door.

As illustrated in Figure 1, the lock extends into the interior of the door through the opening 13 with an enlarged flange 14 on the outer end of its casing overlying the peripheral portion of the side wall 6 surrounding the hole or opening 13.

To secure the lock against rotation the opening 13 has spaced teeth 15 which interengage with lugs 16 on the lock casing directly inwardly of its enlarged flange 14. Consequently, when properly engaged in the opening 13, the lock casing will be securely held against rotation.

To fasten the lock in place, a novel fastening member 17 is provided. This fastening member has a substantially circular flat wall 18 projected into the interior of the door to be disposed coaxially to the opening 13, through a slot 19 in the end wall 7 of the door.

The circular wall 18, as best illustrated in Figure 5, is formed to provide an annular portion 20 engageable with the inner surface of the side wall 6, and a central rearwardly offset portion 21 which is bored to receive the lock casing, and like the hole 13 in the door side wall, has alternate teeth and spaces 22 and 23, respectively.

The spaces 23 are of a size to permit the passage of lugs 24 on the lock casing therethrough so that when the fastening member 17 is in its position of rotation, illustrated in Figure 3, at which its teeth and spaces align with the teeth and spaces formed about the periphery of the hole 13 in the door wall, insertion of the lock into the door is permitted.

To facilitate such insertion of the lock, the inner ends 25 of the lugs 24 are inclined as shown.

The location of the lugs 24 on the lock casing is such that their outer surfaces 26 are spaced from the adjacent wall of the flange 14 on the lock casing a distance just slightly less than the combined thickness of the door wall 6 and the height of the center portion 21 of the fastening member 17, and at one end the outer surfaces 26 of the lugs 24 are inclined as at 27 so that upon rotation of the fastening member 17 about the lock from its position shown in Figure 3 to its position shown in Figure 4, the teeth 22 of the fastening member are forced under the lugs 24 to pull the lock into the door with a spring tension as will be readily apparent.

The slot 19 through which the fastening member 17 is inserted into the interior of the door is of sufficient length to permit this swinging movement of the fastening member, the outer end of which has an angularly directed flange 29 adapted to overlie the end wall 7 and cover the slot 19. A screw 30 passing through the flange 29 and threaded into the end wall 7, secures the fastening member in its operative position as illustrated.

To increase the rigidity of the fastening member, a flange 31 is formed along one edge of its arm as illustrated.

From the description thus far, it will be readily apparent that the interengagement of the lugs 16 with the teeth 15 in the door wall securely holds the lock casing against forced rotation, and that the engagement of the teeth 22 on the fastening member under the lugs 24 rigidly holds the lock casing against endwise movement, and that as the teeth 22 are placed under spring tension during the application of the fastening member, the possibility of developing rattles due to loosening of the parts is entirely precluded.

In the embodiment of the invention illustrated in Figures 6, 7, and 8, the fastening member 32 is of different construction and is applied differently, but the lock casing is secured against rotation in the same manner. Lugs 34 on the lock casing directly inwardly of its outer flange 14 interengage with teeth 35 formed about the periphery of the hole 13 in the door wall 6.

The fastening member 32 in this instance comprises a substantially U shaped stamping having spaced parallel arms 36 projectible through the slots 37 in the end wall 7 to embrace the lock casing and engage lugs 38 formed on the casing.

The arms 36 slidably ride on the inner surface of the door wall 6 and their rear edges 39 are inclined to engage the correspondingly inclined outer walls 40 of the lugs 38 as the fastening member is pushed inwardly, to draw the lock securely in place. To preclude disengagement of the arms 36 from the lugs, the outer edges of the lugs are hooked over the arms, as illustrated.

The connecting portion 41 of the U shaped fastening member is secured flat against the end wall 7 by a fastening screw 42.

To permit the passage of the lugs 38 during the insertion of the lock into the door, the wall 6 has recesses 43 communicating with its hole 13. These recesses are covered by the flange 14 on the lock casing when the lock is in place.

From the foregoing description taken in connection with the accompanying drawings, it will be readily apparent to those skilled in the art to which this invention appertains, that this invention affords a very simple and rugged fastening device for securing cylinder locks in automobile doors and that the application of the locks to the doors by this means is a simple matter.

What I claim as my invention is:

1. In combination with a lock and an apertured wall to which the lock is to be secured, means to secure the lock to the wall comprising, a lug on the lock having a wall spaced from said apertured wall, and a fastening member having an aperture to receive the lock and a recess communicating with said aperture to allow for the passage of said lug, said fastening member being rotatable about the lock to move its recess out of alignment with the lug and to engage a portion of said member with the wall of the lug adjacent the apertured wall.

2. Means to secure a lock in an automobile door having a side wall and an end wall, the side wall having a hole through which the lock projects into the door, a flange on the lock engaging the outer face of the side wall to limit inward movement of the lock, and a fastening member projecting through an opening in the end wall and having parts engaging opposite sides of the lock, the engagement between said parts and the lock being such that upon establishing said engagement an inward endwise force and substantially no sidewise force is engendered upon the lock to draw the lock firmly into the door and secure the same against outward movement.

3. In combination, two angularly disposed adjacent walls, a cylinder lock having a flanged casing projecting through a hole in one wall with its flange engaging the outer face of said wall and its body positioned adjacent the other wall, a fastening member projecting through an opening in the other wall with parts adjacent opposite sides of the lock casing, and interengaging means on said opposite sides of the lock casing and said parts of the fastening member cooperable upon proper positioning of said fastening member to draw the lock casing into the hole in said first designated wall to snugly engage the flange of the lock casing with the exterior of said wall and to firmly hold the casing in such position against outward movement.

4. In combination, two angularly disposed adjacent walls, a cylinder lock having a flanged casing to be secured in a hole in one wall, interengaging means on the lock casing and said wall to hold the casing against rotation, a fastening member projecting through an opening in the other wall and having a part engaging the inner face of said first designated wall adjacent the lock casing, and interengaging means between said part of the fastening member and opposite sides of the lock casing to draw the lock casing in an axial direction to snugly engage its flange with the outer surface of said first designated wall and to firmly hold the casing against outward axial movement.

5. In combination with an automobile door having a side wall and an end wall and a cylinder lock to be secured in the door, the side wall of the door having a hole to receive the lock and the lock having a flanged casing insertable into the said hole with the flange engaging the outer surface of said side wall, interengaging means on the casing and the side wall to hold the lock casing against rotation, and a fastening member projecting through an opening in the end wall and having a part engaging the inner surface of the side wall closely adjacent the casing, fixed abutments on opposite sides of the casing and means on said part of the fastening member having a wedging engagement with said fixed abutments on the casing to wedge said part of the fastening member between the fixed abutments and the side wall to draw the casing into the door with its flange snugly engaging the outside surface of the side wall and to firmly hold the casing against outward withdrawal.

6. In combination with an automobile door having a side wall and an end wall, a cylinder lock having a flanged casing mounted in a hole in the side wall with its flange engaging the outer face of the side wall, abutments on opposite sides of the casing, and a fastening member projected into the interior of the door through an opening in the end wall with portions thereof wedged between said abutments and the inner surface of the side wall to draw the lock casing into the door with its flange tight against the side wall.

7. In combination, two angularly disposed adjacent walls, a cylinder lock having a casing inserted through a hole in one of said walls, means on said casing engageable with the outer face of said wall to limit inward movement of the casing, a fastening member projecting through an opening in the other wall and having a part engaging the inner face of said first designated wall adjacent the casing, and wedge means on said casing engageable with said part of the fastening member with a wedge connection, whereby the positioning of the fastening member wedges said part of the fastening member between the inner face of the first designated wall and said wedge means on the casing to secure the lock casing to said first designated wall.

8. In combination with a door having a side wall and an end wall, a cylinder lock inserted through a hole in the side wall, an abutment on the cylinder lock, and a clamp inserted through an opening in the end wall and embracing the cylinder lock and adapted to engage said abutment upon rotation of the clamp about the axis of the cylinder lock to secure the cylinder lock in place.

9. The combination with a cylinder lock having a head and a wall having a hole to receive the cylinder lock with its head engaging one face of the wall, of means to draw the cylinder lock through the hole in the wall in a direction to firmly hold its head against said face of the wall comprising abutments on opposite sides of the cylinder lock and spaced from said wall, and a fastening member slidable across the inner surface of said wall with portions thereof having a wedge-like engagement with said abutments so that movement of said fastening member across the inner surface of the wall wedges said portions thereof between the abutments and the wall to draw the cylinder lock in an endwise direction into the hole in the wall.

10. The combination with a cylinder lock and a wall having a hole in which the cylinder lock is disposed, of means for securing the cylinder lock to the wall comprising an abutment on the cylinder lock spaced from the apertured wall, and a fastening member encircling the cylinder lock with a portion thereof disposed between said abutment and the inner surface of the wall, the engagement between said abutment and said portion of the fastening member being wedge-like so that upon movement of the fastening member about the axis of the cylinder lock said portion of the fastening member is wedged between the abutment and the wall to draw the cylinder lock into the hole in the wall.

11. Means for securing a cylinder lock having a flanged casing in a hole in a wall with its flange engaging the mouth of the hole, comprising an abutment projecting out from the peripheral surface of the casing, and a wedge adapted to move past the peripheral surface of the casing and to engage under said abutment.

12. Means for securing a cylinder lock having a flanged casing in a hole in a wall with its flange engaging the mouth of the hole, comprising abutments on opposite sides of the casing and a wedging member having portions rotatable about the casing and engageable between said abutments and the wall in a wedging action to firmly secure the casing in said hole.

13. A fastening for a cylinder lock having a flanged casing adapted to rest in a hole in a wall with its flange engaging the mouth of the hole, comprising an abutment on the casing, a rotary wedge embracing the casing and having a part engageable under the abutment upon rotary movement of the wedge about the axis of the cylinder lock, an arm on the wedge by which rotary motion may be imparted thereto, and means to fix said arm in an adjusted position.

14. The combination with a cylinder lock having a flanged casing and a wall having a hole in which the lock is disposed with the flange of its casing engaging the mouth of the hole, of means for securing the cylinder lock to said wall comprising lugs spaced circumferentially about the casing, and a fastening member having an opening to allow the passage of the casing therethrough, said opening having recesses in its periphery to accommodate the lugs on the casing, and the peripheral portions of the opening between said recesses being engageable under the abutments upon rotation of the fastening member about the axis of the cylinder lock with a wedge-like action to draw the casing firmly into the hole in the wall.

15. Means to secure a cylinder lock in an automobile door having a side wall with a hole to receive the cylinder lock and an end wall provided with a slot, comprising a flange on the lock engaging the mouth of the hole in the side wall to limit inward movement of the lock, abutments on the cylinder lock spaced circumferentially thereabout and spaced inwardly from the inner surface of the side wall, and a fastening member projecting through the slot in the end wall and having an opening through which the cylinder lock projects, said opening being formed with recesses to accommodate the abutments on the lock cylinder and the portions of the periphery of the opening between said recesses being engageable with the abutments upon rotation of the fastening member about the axis of the cylinder lock in a wedge-like action to draw the cylinder lock firmly into the hole, and an arm on the fastening member projecting through the slot in the end wall to afford means for imparting rotation to the fastening member, and means for securing said arm in a fixed position to the end wall.

16. A fastening for a cylinder lock having a flanged casing adapted to rest in a hole in a wall with the flange engaging the mouth of the hole, comprising abutments at opposite sides of the cylinder lock, a substantially U-shaped fastening member having its arms slidable edgewise across the inner surface of the wall past opposite sides of the casing and under the abutments, the edges of said arms not engaged with the wall being arranged to have a wedge-like engagement with their abutments so that said arms may be wedged edgewise between the abutments and the inner surface of the wall to firmly hold the casing in said hole, and means to secure the U-shaped fastening member immovably in its fastening position.

17. In combination, two angularly disposed adjacent walls, a cylinder lock having a flanged casing projecting through a hole in one wall with its flange engaging the outer face of said wall and its body positioned adjacent the other wall, abutments on opposite sides of the casing lying in a plane substantially parallel with said other wall, and a U-shaped fastening member having spaced arms projecting through openings in said other wall and slidable across the inner surface of the first designated wall past the casing and under said abutments to firmly wedge said arms of the U-shaped fastening member between the abutments and the inner surface of said first designated wall.

18. In combination two angularly disposed adjacent walls, a cylinder lock having a flanged casing projecting through a hole in one wall with its flange engaging the outer face of said wall and its body positioned adjacent the other wall, abutments on opposite sides of the casing lying in a plane substantially parallel with said other wall, a U-shaped fastening member having spaced arms projecting through openings in said other wall and slidable across the inner surface of the first designated wall past the casing and under said abutments to firmly wedge said arms of the U-shaped fastening member between the abutments and the inner surface of said first designated wall, and means for securing said fastening member to said other wall.

19. In combination with an automobile door having a side wall and an end wall, a cylinder lock having a headed casing to be secured in the door, the side wall of the door having a hole to receive the casing with its head engaging the outside face of the side wall, interlocking means on the casing and the side wall to hold the casing against rotation, means for drawing the casing through said hole in the side wall of the door to firmly hold its head against the outside face of said door of the side wall, and thus secure the casing against endwise movement comprising abutments on opposite sides of the casing spaced from the inner surface of the side wall, and a fastening member projecting through an opening in the end wall and having parts wedged between said abutments on the casing and said side wall.

EDWARD N. JACOBI.